United States Patent [19]
Takeuchi et al.

[11] Patent Number: 5,199,044
[45] Date of Patent: Mar. 30, 1993

[54] SYSTEM FOR DETECTING POSITION OF OBJECT HAVING DATA CARRIER

[75] Inventors: Kunihiko Takeuchi, Kawasaki; Masao Oba, Yokohama, both of Japan

[73] Assignee: Tokimec Inc., Tokyo, Japan

[21] Appl. No.: 698,774

[22] Filed: May 13, 1991

[30] Foreign Application Priority Data

| May 22, 1990 [JP] | Japan | 1-32322 |
| May 22, 1990 [JP] | Japan | 1-32323 |
| May 22, 1990 [JP] | Japan | 1-32324 |

[51] Int. Cl.$^5$ ............................ H04L 27/30
[52] U.S. Cl. .............................. 375/1; 380/34; 342/419; 342/458
[58] Field of Search ............... 375/1; 380/34; 342/27, 342/28, 419, 458; 340/552-554

[56] References Cited

U.S. PATENT DOCUMENTS

| 3,947,834 | 3/1976 | Gershberg et al. | 340/554 |
| 3,986,182 | 10/1976 | Hackett | 342/28 X |
| 4,327,358 | 4/1982 | Karas | 342/27 |
| 4,588,988 | 5/1986 | Karas | 340/552 |
| 4,792,804 | 12/1988 | Rubechini | 342/27 |
| 5,018,165 | 5/1991 | Sohner et al. | 375/1 |

Primary Examiner—Bernarr E. Gregory
Attorney, Agent, or Firm—Wenderoth, Lind & Ponack

[57] ABSTRACT

A plurality of data carriers are prepared and possessed by, for example, persons who enter a building. The data carrier spread spectrum modulates a carrier signal of a predetermined frequency by an assigned Gold series corresponding to an ID code and transmits the modulated signal. Leaky cables each having a predetermined length are two-dimensionally distributed and arranged in the building. A frequency converter is connected to one end of each of the leaky cables and frequency converts the spread spectrum signal from the data carrier which has propagated the leaky cable into a frequency unique to the cable and sends the converted frequency signal to a central receiving unit through a transmission cable. The receiving unit individually demodulates the signal series from the reception signals and sequentially executes correlation calculations between the signal series and the Gold series assigned to the data carriers. The position of the leaky cable where the data carrier exists is obtained on the basis of a time difference between the time when a correlation peak value of the reception signal series demodulated by the frequency unique to the data carrier has been obtained by the correlation calculations and the time when a correlation peak value of the reception signal series demodulated by the frequency unique to the leaky cable has been obtained. The data carrier is discriminated from reference Gold series used in the correlation calculations of the correlation peak values.

9 Claims, 13 Drawing Sheets

SYSTEM FOR DETECTING POSITION OF OBJECT HAVING DATA CARRIER

BACKGROUND OF THE INVENTION

The present invention relates to a system for receiving a transmission signal from a data carrier provided for a person, an object, or the like located in a building, a factory, or the like and for detecting the position where the person or object exists and, more particularly, to a system for detecting the position of the person or object by using spread spectrum communication.

In recent years, in association with the progress of the office automation or factory automation, it is desired to centrally manage the movements of persons or objects in a building and to properly promptly distribute information or items.

For example, in a building system which has recently been proposed, persons who enter a building possess ID cards, a managing system of the building recognizes the ID cards, thereby always grasping the locations of such persons. For instance, the managing system, can automatically transfer a received telephone call to a telephone located near a recognized person. On the other hand, in response to the use of an apparatus such as a work station or the like, the building managing system transmits a user format which is peculiar to the recognized person, thereby enabling personal use.

To realize such a building system, it is required that a communicating function such as a data carrier is provided for the ID card, a peculiar ID code is transmitted by a radio system, the transmission signal is received on the system side, and the ID code and the position are recognized.

However, a system in which ID cards (data carriers) are provided for ten thousand or more persons per building and in which ID code signals are transmitted by radio and the positions of all of the persons in the building is always recognized has not yet proposed and has not been put into practical use at present.

This is because in a radio wave propagating space such as an inner room of a building, a factory, or the like, there exists strong interferences caused by the multiple reflections of objects installed in the room and thus normal communication can not be expected using the ordinary communicating system. Also, the transmission electric power from the ID card which is used as a data carrier is extremely weak because of power source limitations and a communication quality of a high realiability cannot be obtained due to S/N ratio problems.

SUMMARY OF THE INVENTION

It is an object of the invention to provide an object position detecting system which can always recognize positions of a number of persons in a room of an office building, a factory, or the like in a real-time manner.

Another object of the invention is to provide an object position detecting system which can always recognize positions of a number of objects in a room of an office building, a factory, or the like in a real-time manner.

Still another object of the invention is to provide an object position detecting system in which leaky cables for receiving and transmitting radio signals which are transmitted from a data carrier are installed in a building.

Another object of the invention is to provide an object position detecting system in which leaky cables are two-dimensionally arranged in a building.

Another object of the invention is to provide an object position detecting system in which pseudo random series are transmitted from data carriers and a correlation calculation is executed on a reception side.

Another object of the invention is to provide an object position detecting system using a Gold series as the pseudo random series which are transmitted from data carriers.

According to the invention, a plurality of portable data carriers are first prepared and are possessed by,, for instance, persons who enter a building. Unique pseudo random series are assigned to the data carriers corresponding to ID codes. A carrier signal of a predetermined frequency is spread spectrum modulated by the assigned pseudo random series and is transmitted.

On the other hand, on the building side, leaky cables each having a predetermined length are two-dimensionally distributed and installed in the structure. A frequency converter is connected to one end of each of a plurality of leaky cables 12-1 to 12-n each having a predetermined line length (L). A spread spectrum signal from the data carrier which has been propagated in the leaky cable, is frequency converted into a frequency which is unique to the cable. A plurality of leaky cables are commonly connected to one transmission cable. The transmission cable is connected to a central receiving unit.

Gold series are used as pseudo random series which are used in the data carriers.

A carrier signal of a frequency which has been spread spectrum modulated by the Gold series transmitted from a special data carrier is received by the leaky cable near the special data carrier and is transmitted to both end sides of the leaky cable. After that, the carrier signal is frequency converted into the frequency which is unique to the cable by the frequency converter connected to one end of the cable. The converted frequency signal is multiplexed to the signal at the other end of the cable and is sent to the receiving unit.

The receiving unit individually demodulates the signal series from the frequency modulated reception signals from the transmission cables and sequentially executes correlation calculations of each reception signal series and the Gold series assigned to the data carrier. As a time difference between a time $T_1$ when a correlation peak value of the reception signal series which had been demodulated by the frequency unique to the data carrier is obtained by the correlation calculation and a time $T_2$ when a correlation peak value of the reception signal series which had been demodulated by the frequency peculiar to the leaky cable is obtained, a delay time $\Delta T$ is detected as $$\Delta T = T_2 - T_1$$

The delay time $\Delta T$ depends on distances $L_1$ and $L_2$ from the position on the leaky cable where the data carrier exists to both ends $E_1$ and $E_2$ of the cable. Now, assuming that a propagating speed of the leaky cable is set to C [m/nsec] and a cable length is set to L [m], a distance difference $\Delta L$ is obtained as follows.

$$\Delta L = L_2 - L_1 = C \cdot \Delta T$$

Therefore, the distance $L_1$ from the end $E_1$ of the cable is obtained as follows.

$$L_1 = (L - \Delta L)/2$$

On the other hand, the data carrier can be discriminated from the reference Gold series which have been used in the receiving unit and the correlation calculation of the correlation peak values.

A plurality of leaky cables are not necessarily commonly connected by the transmission cables but can also be individually and separately connected to the receiving unit through transmission cables.

Further, the frequency converter is not necessarily connected to one end, of each of the leaky cables, but each end of the leaky cable can be directly connected to the receiving unit through the transmission cable.

The above and other objects, features, and advantages of the present invention will become more apparent from the following detailed description with reference to the drawings.

DETAILED DESCRIPTION OF THE PREFERRED EMBODIMENTS

Figure 1:
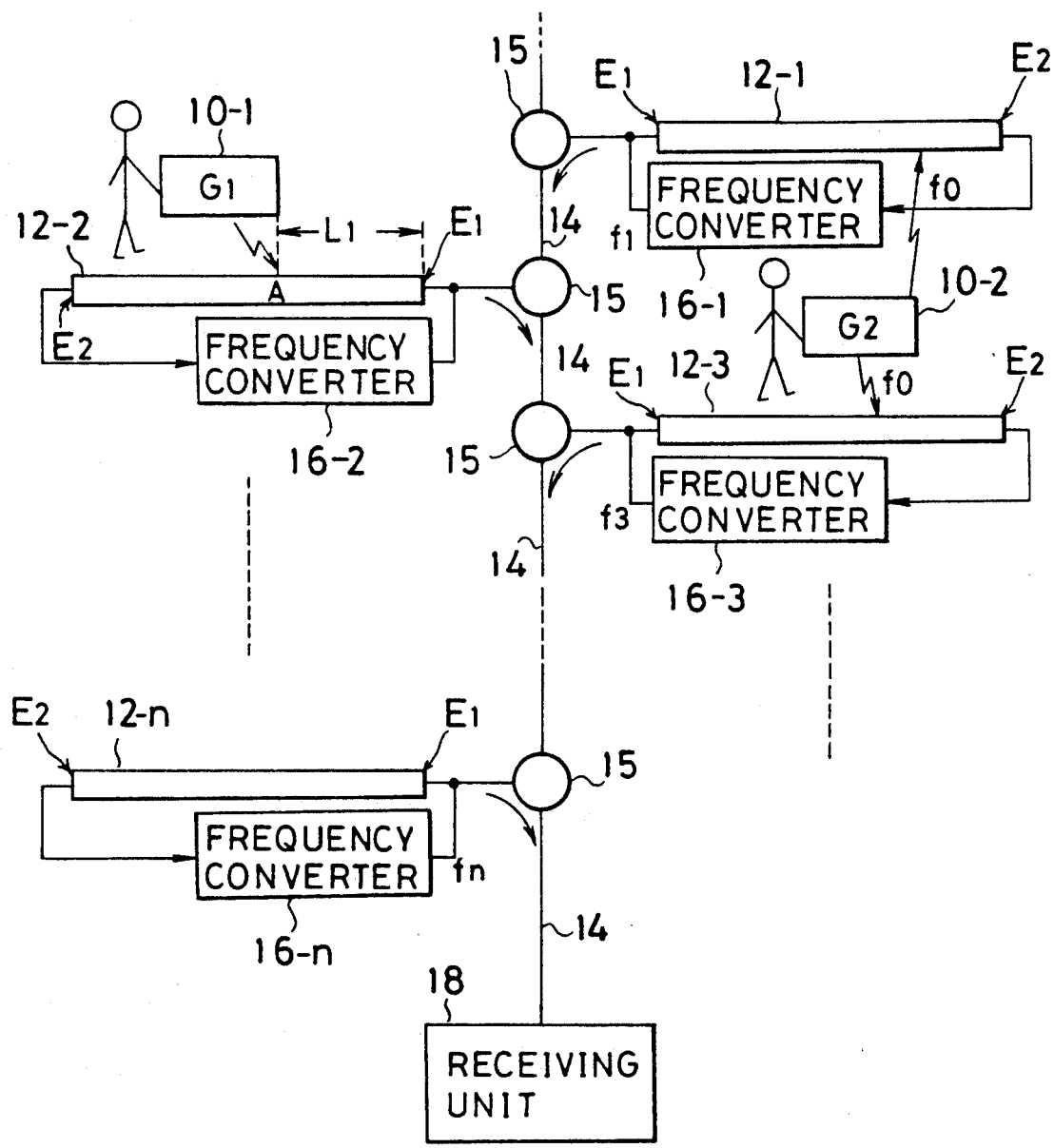
FIG. 1 is a constructional diagram showing the first embodiment of the invention.

FIG. 1 is a constructional diagram showing the first embodiment of the invention.

In FIG. 1, reference numerals 12-1, 12-2, . . . , 12-n denote leaky cables which are branch-connected through circulators 15 to a transmission cable 14 which has been led out of a receiving unit 18, respectively. That is, the leaky cables 12-1 to 12-n are two-dimensionally arranged like branches in which the transmission cable 14 is used as a trunk. One end $E_1$ of each of the leaky cables 12-1 to 12-n is directly connected to the transmission cable 14 through the circulator 15.

On opposite hand, the other ends $E_2$ of the leaky cables 12-1 to 12-n are input-connected to frequency converters 16-1 to 16-n provided for the cables, respectively. Outputs of the frequency converters 16-1 to 16-n are directly connected to the transmission cable 14 through the circulators 15 together with the cable ends $E_1$.

The transmission cable 14, circulators 15, leaky cables 12-1 to 12-n, and frequency converters 16-1 to 16-n are installed along and under the floor or along and within the ceiling of a room of, for instance, a building, a factory, or the like. The building side of the system is thus constructed as mentioned above.

On the, other hand, data carriers 10-1 and 10-2 as shown in FIG. 1, for example, are possessed by persons who enter the building, respectively. Gold series $G_1$ and $G_2$ each having a predetermined word length as one kind of pseudo random series (PN series) have previously been assigned to the data carriers 10-1 and 10-2. Therefore, the data carriers 10-1 and 10-2 spread spectrum modulate a carrier signal of a frequency $f_0$ which has been commonly assigned to all of the data carriers by the Gold series $G_1$ and $G_2$ and transmit the modulated signal, respectively.

Figure 2:
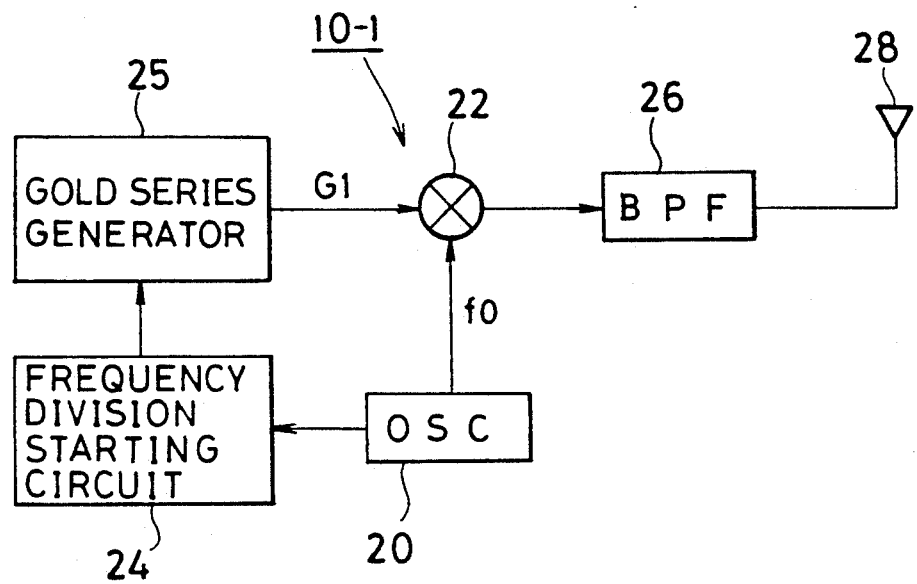
FIG. 2 is a block diagram showing an embodiment of a data carrier which is used in the invention.

FIG. 2 is a block diagram showing an embodiment of a data carrier for explaining the data carrier 10-1 in FIG. 1 as an example.

In FIG. 2, the data carrier 10-1 comprises: an oscillator 20; a multiplier 22; a frequency division starting circuit 24; a Gold series generator 25; a band pass filter 26; and a transmission antenna 28.

The oscillator 20 generates the carrier signal of the frequency $f_0$ (first frequency) which is common to all of the data carrier and applies the carrier signal to the multiplier 22. The oscillation output the oscillator 20 is also supplied to the frequency division starting circuit 24. Frequency division pulses which have been frequency divided at a predetermined frequency dividing ratio are supplied from the starting circuit 24 to the Gold series generator 25.

The Gold series generator 25 generates the Gold series $G_1$ of a predetermined word length which has previously been assigned. It is known that the Gold series are codes which are generated by using M series as a preferred pair. The preferred pair denotes a combination of M series which uniformly have small cross-correlation values. Thus, when correlation values (cross-correlation values) of different Gold series are calculated, a small cross-correlation value which is certainly uniform is assured in any case and an S/N ratio in the case where an autocorrelation has been derived can be guaranteed.

On the other hand, although the kind of Gold series which can be assigned to the data carrier is determined by the word length of the Gold series, about a hundred thousand different Gold series can be assigned so long as the maximum word length of the Gold series which has been found out until now is used. Thus, a hundred thousand data carriers can be discriminated and prepared per building or facility.

The Gold series $G_1$ of a predetermined word length is generated from the Gold series generator 25 synchronously with the frequency division pulses from the frequency division starting circuit 24 every predetermined period. The Gold series $G_1$ has a time sequence of chip components comprising bits 1 or 0 corresponding to the word length for a series time duration T as shown in, for instance, FIG. 3. Bit 1 corresponds to the signal of +1 and bit 0 corresponds to the signal of −1. A period of one chip component is shown by a chip period $\Delta T_c$.

Figure 3:
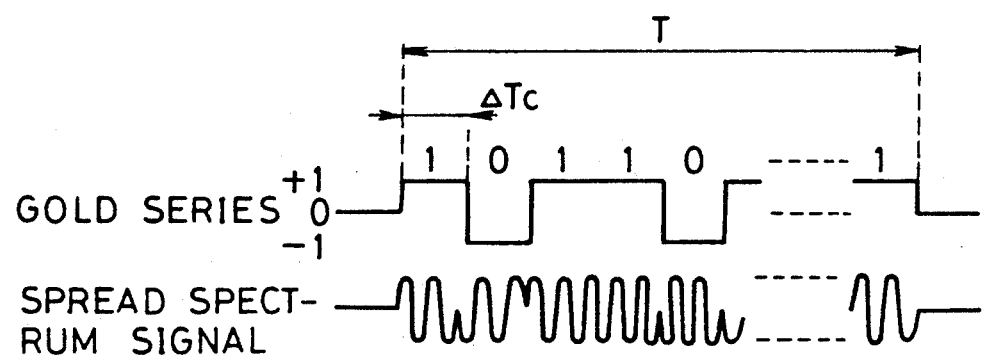
FIG. 3 is an explanatory diagram of a spread spectrum modulation in FIG. 2.

The Gold series $G_1$ from the Gold series generator 25 is multiplied to the carrier signal of the frequency $f_0$ from the oscillator 20 by the multiplier 22. The frequency $f_0$ of the carrier signal has a carrier period which is a fraction of an integer of the chip period $\Delta T_c$ of the Gold series in FIG. 3. In the case of FIG. 3, the frequency $f_0$ is set to half the chip period $\Delta T_c$. The multiplier 22 multiplies the Gold series and the carrier signal, thereby producing a spread spectrum signal (phase modulation signal) in which a phase of the carrier signal is inverted when the Gold series changes from +1 to −1 or from −1 to +1 as shown in FIG. 3. The spread spectrum signal from the multiplier 22 is band limited by the band pass filter 26 and, thereafter, it is transmitted from the transmission antenna 28.

A transmission electric power from the data carrier 10-1 is extremely weak because a power source such as a solar battery or the like is used. A transmission electric power, it is sufficient to use a very weak transmission electric power may be used which is sufficient to assure an effective propagation distance of about 2 m in consideration of the installation intervals and installation positions of the leaky cables 12-1 to 12-n shown in FIG. 1.

Returning to FIG. 1, in the embodiment, the diagram shows the case where a person who possesses the data carrier 10-1 to which the Gold, series $G_1$ has previously been assigned is located near the leaky cable 12-2 and a person who possesses the data carrier 10-2 to which the Gold series $G_2$ has previously been assigned is located between the leaky cables 12-1 and 12-3.

Figure 4:
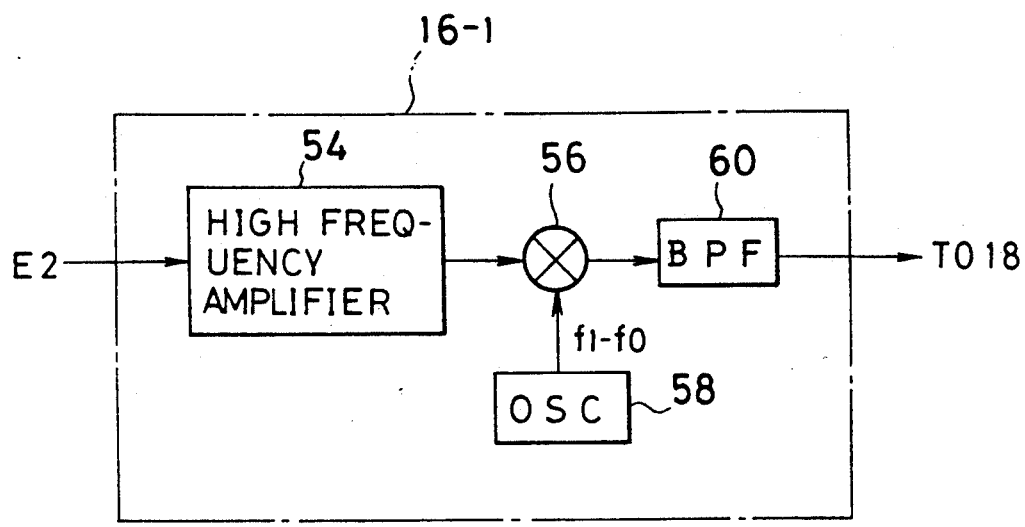
FIG. 4 is a block diagram showing an embodiment of a frequency converter in the invention.

As shown by the example of FIG. 4, each of the frequency converters 16-1 to 16-n connected to the leaky cables 12-1 to 12-n or the like comprises: a high frequency amplifier 54; a mixer 56; a shift frequency oscillator 58; and a band pass filter 60.

Figure 5:
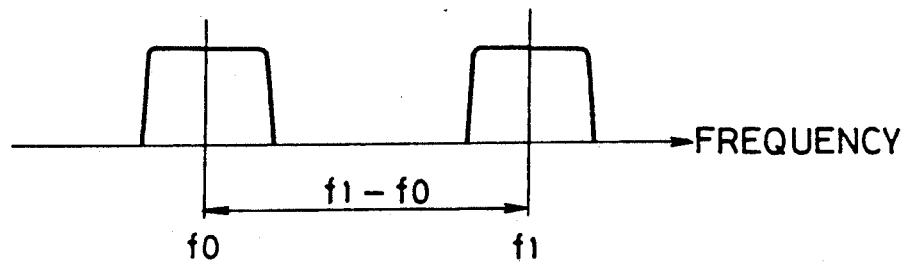
FIG. 5 is an explanatory diagram of the frequency conversion in FIG. 4.

That is, a propagation signal due to the reception of the spread spectrum signal of the frequency $f_0$ from the data carrier 10-2 near the leaky cable 12-1 in FIG. 1 is supplied to the frequency converter 16-1 and is amplified by the high frequency amplifier 54. After that, the amplified signal is given to the mixer 56. An oscillation output of a frequency $(f_1 - f_0)$ is given to the other input terminal of the mixer 56 from the shift frequency oscillator 58 and is mixed into the spread spectrum signal of the frequency $f_0$. Thus, the signal of the spread center frequency $f_0$ is frequency converted into the signal of the spread center frequency $f_1$ which is unique to the leaky cable 12-1 as shown in FIG. 5. Finally, an output signal of the mixer 56 is band limited by the band pass filter 60 having the center frequency $f_1$ and, after that, it is transmitted to the receiving unit 18.

Each of the other frequency converters 16-2 to 16-n has the same construction as that of the frequency converter 16-1 shown in FIG. 4. Since frequencies $f_2$ to $f_n$ which are unique to the leaky cables 12-2 to 12-n are set for the frequency converters 16-2 to 16-n, frequency signals of $(f_2 - f_0)$ to $(f_n - f_0)$ are oscillated from the oscillator 58 and are frequency converted.

Figure 6:
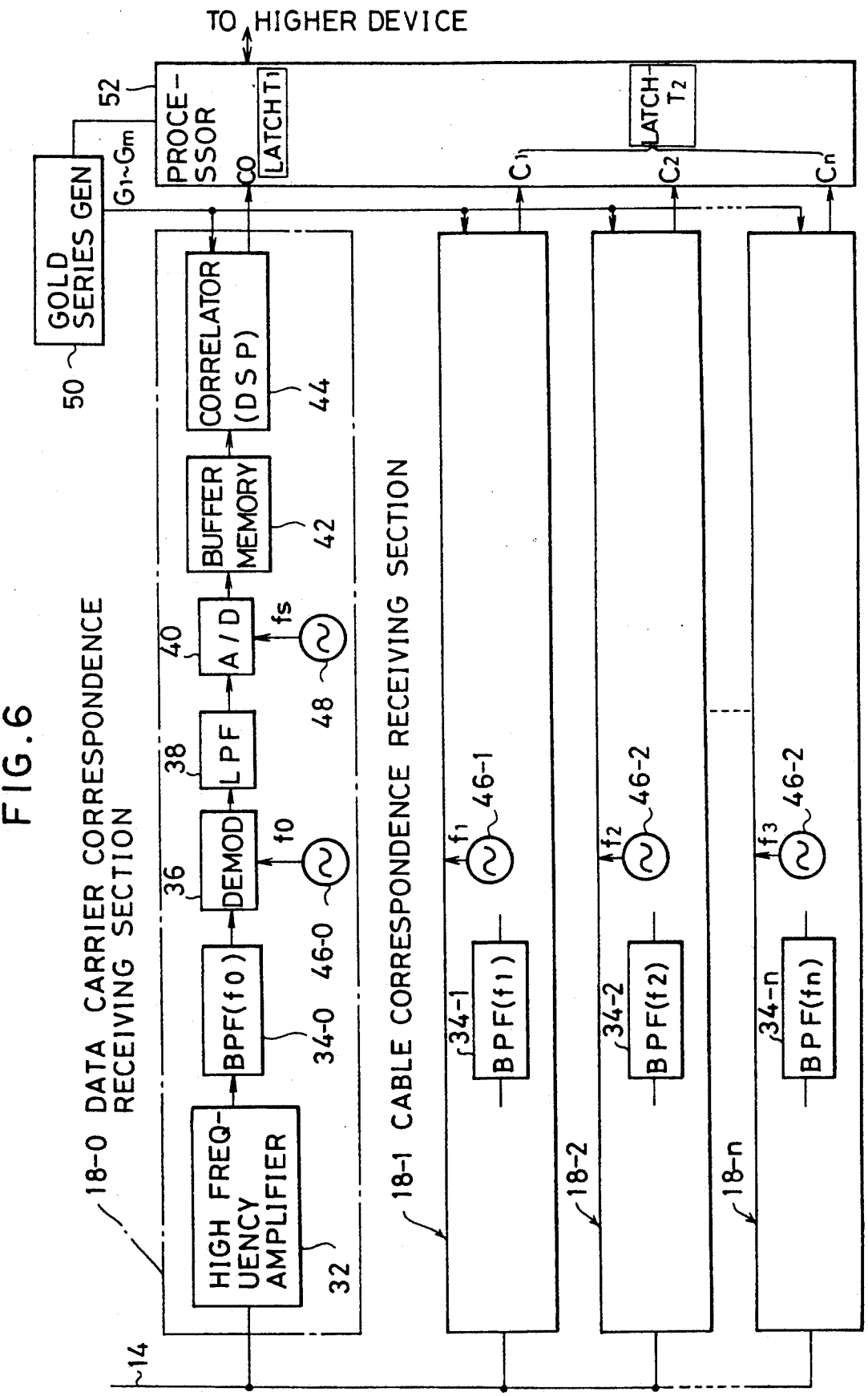
FIG. 6 is a block diagram showing an embodiment of a receiving unit in the invention.

FIG. 6 is a block diagram showing an embodiment of the receiving unit 18 shown in FIG. 1.

In FIG. 6, the receiving unit 18 comprises: a data carrier correspondence receiving section 18-0 corresponding to the data carrier; and cable correspondence receiving sections 18-1 to 18-n corresponding to the leaky cables 12-1 to 12-n.

The data carrier correspondence receiving section 18-0 comprises: a high frequency amplifier 32; a band pass filter 34-0 of the center frequency $f_0$; a demodulator 36 having a local oscillator 46-0 of the oscillating frequency $f_0$; a low pass filter 38; an A/D converter 40 having an oscillator 48 which oscillates a sampling frequency $f_s$; a buffer memory 42; and a correlator 44 using a DSP.

On the other hand, the cable correspondence receiving sections 18-1 to 18-n have substantially the same circuit construction as that of data carrier correspondence receiving section 18-0 except that center frequencies of band pass filters 34-1 to 34-n are set to the frequencies $f_1$ to $f_n$ which are unique to the cables and that oscillating frequencies of local oscillators 46-1 to 46-n for the demodulator 36 are set to the frequencies $f_1$ to $f_0$ unique to the cables.

Further, a plurality of Gold series $G_1$ to $G_m$ which have been commonly assigned to all of the data carriers are sequentially commonly given as reference Gold series from a Gold series generator 50 to the correlators 44 provided in the receiving sections 18-0 to 18-n. Therefore, the correlator 44 calculates a correlation between the reception series from the buffer memory 42 and the reference Gold series from the Gold series generator 50, that is, calculates a product sum for every data of one series length which is decided by the sampling period of the A/D converter 40.

Correlation outputs $C_0$ to $C_n$ of the correlators 44 provided in the receiving sections 18-0 to 18-n are given to a processor 52. The processor 52 stores times when peak values of the correlation outputs $C_0$ to $C_n$ have been derived into latches $T_1$ and $T_2$, respectively. Namely, the peak value detection time of the correlation output $C_0$ from the data carrier correspondence receiving section 18-0 is stored into the latch $T_1$. On the other hand, the peak value detection time from either one of the correlation outputs $C_1$ to $C_n$ of the cable correspondence receiving sections 18-1 to 18-n is stored into the latch $T_2$. On the basis of the peak detection times in the latches $T_1$ and $T_2$, the processor 52 calculates the distance $L_1$ from the cable end $E_1$ on the side of the circulator 15 to a reception point A of the transmission signal from the data carrier 10-1 in the case of, for instance, the leaky cable 12-2 in FIG. 1. The processor 52 also recognizes the data carrier on the basis of the Gold series from the Gold series generator 50 which has been used to calculate the correlation peak values for the time detection of the latches $T_1$ and $T_2$.

The operation of the receiving unit 18 in FIG. 6 will now be described in detail.

It is now assumed that a person who possesses the data carrier 10-1 is located near the leaky cable 12-2 in FIG. 1. When the spread spectrum signal having the frequency $f_0$ is transmitted from the data, carrier 10-1, the signal is received at the A point of the leaky cable 12-2. The reception signal is propagated from the A point toward the cable ends $E_1$ and $E_2$ on both sides of the leaky cable 12-2. A propagation signal which has reached the cable end $E_1$ is sent to the receiving unit 18 through the circulator 15 and the transmission cable 14.

On the other hand, a propagation signal which has reached the cable end $E_2$ is frequency converted into the signal of the frequency $f_2$ unique to the leaky cable 12-2 by the frequency converter 16-2 and is sent to the receiving unit 18.

Therefore, one series of the spread spectrum signal of the frequency $f_0$ and one series of the frequency converted spread spectrum signal of the frequency $f_2$ are received by the receiving unit 18 in order according to a difference between the distances from both cable ends to the reception point A.

The spread spectrum signal of the frequency $f_0$ is amplified by the high frequency amplifier 32 in the data carrier correspondence receiving section 18-0 and, after that, the amplified signal passes through the band pass filter 34-0 having the center frequency $f_0$ and is demodulated into the reception signal series of the base band by the demodulator 36. Further, after the signal is transmitted through the low pass filter 38, it is converted into the digital data by the A/D converter 40 and is stored into the buffer memory 42. The sampling frequency $f_s$ in the A/D converter 40 is determined to a value such that the data can be sampled a plurality of times of two or more times for the chip period $\Delta T_c$ of the Gold series in FIG. 3.

On the other hand, the spread spectrum signal of the frequency $f_2$ which has been subjected to the frequency shift is extracted by the band pass filter 34-2 in the cable correspondence receiving section 18-2 corresponding to the leaky cable 12-2. The extracted signal is likewise demodulated to the reception signal series of the base band by the frequency $f_2$ from the local oscillator 46-2 and, thereafter, the demodulated signal is stored as digital data into the buffer memory 42 in a manner similar to the case of the data carrier correspondence receiving section 18-0.

The correlators 44 in the data carrier correspondence receiving section 18-0 and the cable correspondence receiving section 18-2 read out the reception signal series stored in the buffer memories 42 and execute correlation calculations (product sum calculations) between the read-out reception signal series and the reference Gold series $G_1$ to $G_m$ which are sequentially given from the Gold series generator 50 at that time. When the reference Gold series from the Gold series generator 50 assume $G_1$, they are the same series as the reception signal series, so that correlation peak values are obtained in the correlation outputs $C_0$ and $C_2$ of the correlators 44.

Figure 8:
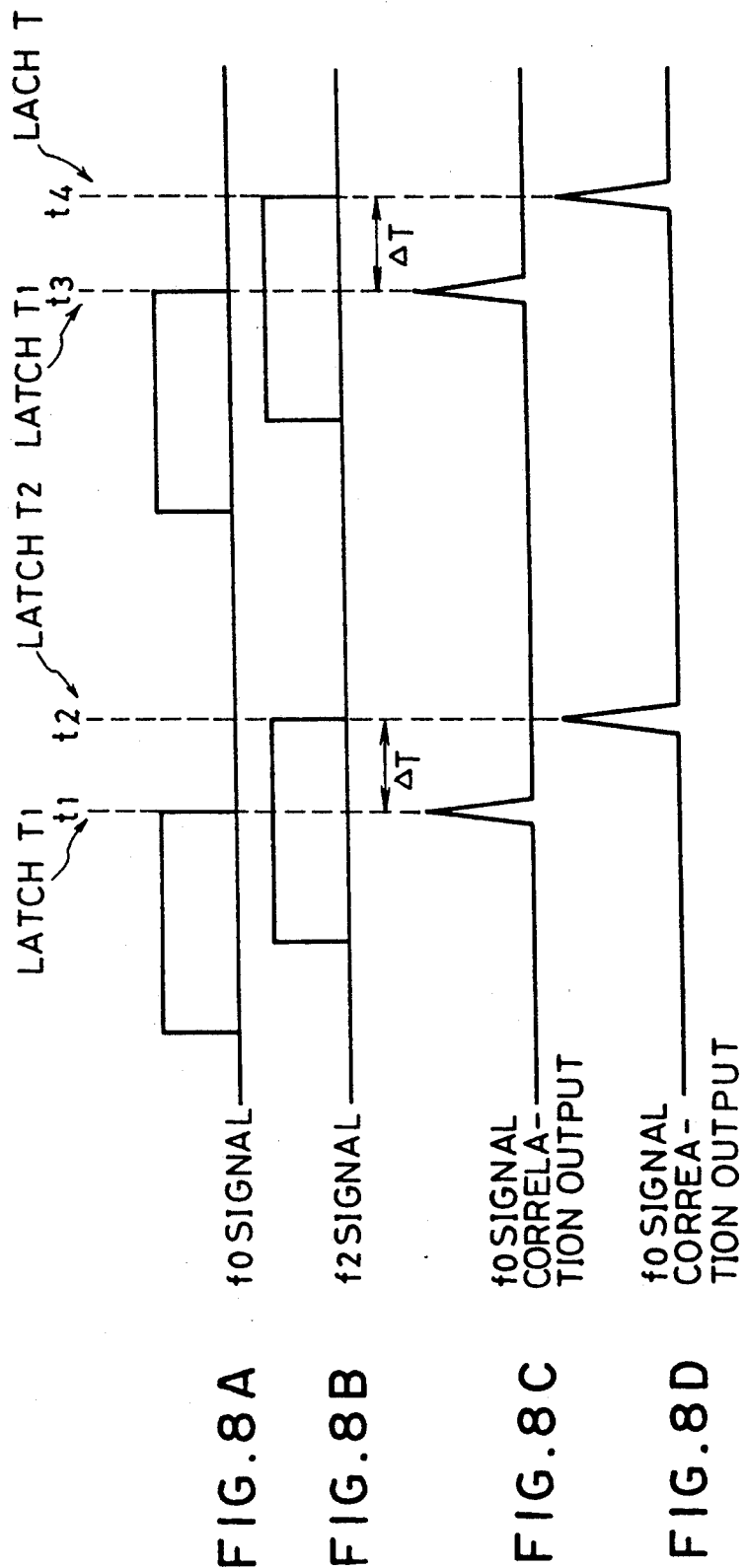
FIGS. 8A to 8D are time charts showing correlation outputs when a delay time is obtained by the receiving unit in the invention.

That is, since the reception point A of the transmission signal from the data carrier 10-1 to the leaky cable 12-2 in FIG. 1 is close to the cable end $E_1$ is far from the cable end $E_2$, as shown in FIG. 8A, the signal series of the frequency $f_0$ are first received. After the elapse of the delay time $\Delta T$ corresponding to the difference between distances from both cable ends to the reception point A, the reception of the signal series which have been frequency converted into the frequency $f_2$ shown in FIG. 8B is started. In the data carrier correspondence receiving section 18-0, if it is assumed that the correlation calculations were executed in a real-time manner, a peak value occurs in the correlation output $C_0$ shown in FIG. 8C at time $t_1$ when the reception of the signal series of the $f_0$ signal has been finished. The time $t_1$ is stored into the latch $T_1$. Subsequently, as shown in FIG. 8D, a peak value is obtained in the correlation output $C_2$ at time $t_2$ by the correlation calculation regarding the signal series of the $f_2$ signal. The second peak value detection time $t_2$ is stored into the latch $T_2$.

The peak generation times $t_1$ and $t_2$ are not detected in a real-time manner, but, for instance, values of write addresses of the series final data when the series data is written into the buffer memory 42 are obtained as times $t_1$ and $t_2$.

When the peak value generation times $t_1$ and $t_2$ of the correlation outputs $C_0$ and $C_2$ are detected by the processor 52 as mentioned above, the processor 52 first calculates the delay time $\Delta T$ as follows.

$$\Delta T = T_2 - T_1 = t_2 - t_1$$

Figure 7:
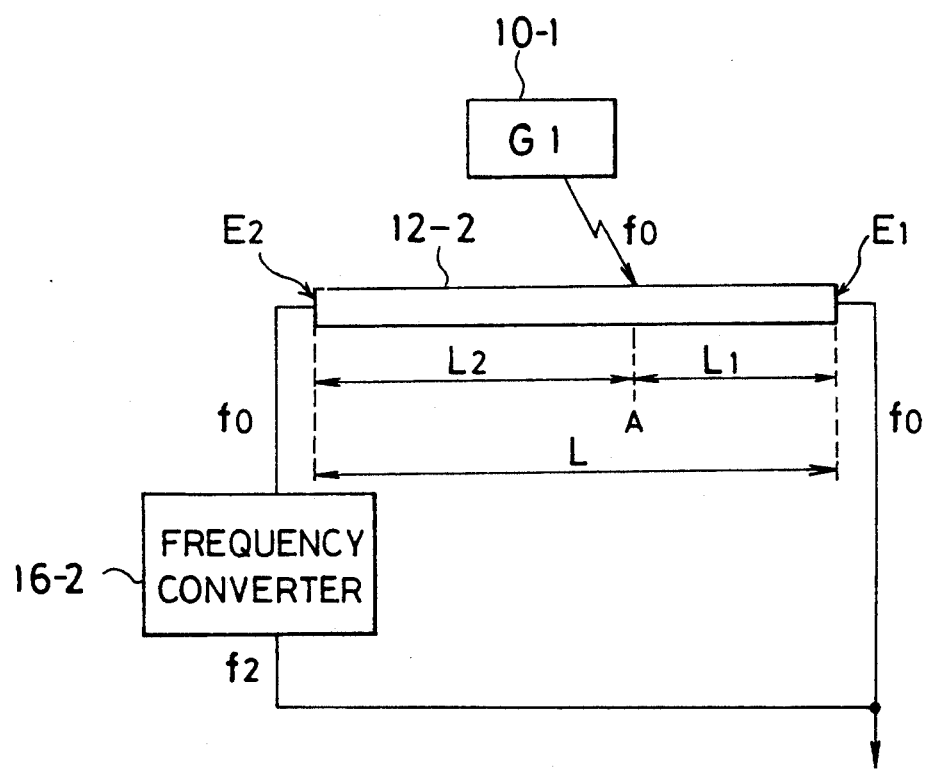
FIG. 7 is an explanatory diagram of a position of a reception point of a leaky cable in FIG. 1.

As shown in FIG. 7 showing the leaky cable 12-2 in FIG. 1, it is now assumed that a length of leaky cable 12-2 is set to L, a distance from the cable end $E_1$ to the reception point A is set to $L_1$, a distance from the cable end $E_2$ to the reception point A is set to $L_2$, and a propagating speed of the signal in the leaky cable 12-2 is set to C [m/nsec].

As will be obviously understood from the distance relation for the reception point A in FIG. 7, the processor 52 calculates a distance difference $\Delta L$ between the propagation distances $L_1$ and $L_2$ on both cable ends to the reception point A as follows by using the delay propagation time $\Delta T$ and the cable delay propagating speed C.

$$\Delta L = L_2 - L_1 = C \cdot \Delta T \tag{1}$$

As will be obviously understood from FIG. 7, there is the following relation.

$$L = L_1 + L_2 \text{ (where, } L_1 < L_2\text{)}$$

By solving the simultaneous equations with the above equation (1), the distance $L_1$ from the cable end $E_1$ to the reception point A is calculated as follows.

$$L_1 = (L - \Delta L)/2 \tag{2}$$

Further, the processor 52 recognizes the data carrier on the basis of the reference Gold series from the Gold series generator 50 which have been used for the calculations of the peak value in the correlation output $C_0$ and the peak value in either one of the correlation outputs $C_1$ to $C_m$. In this case, since the peak value of the correlation output has already been obtained by the reference Gold series $G_1$, the data carrier 10-1 to which the Gold series $G_1$ has been assigned can be recognized.

When the distance $L_1$ from the end $E_1$ of the leaky cable 12-2 to the reception point A and the data carrier 10-1 are recognized, since the position of the leaky cable 12-2 in the building has previously been known on the processor 52 side, the fact that the data carrier exists at the A point of the calculated distance $L_1$ in the building is informed to the higher order apparatus, thereby allowing necessary processes to be executed.

Figure 9:
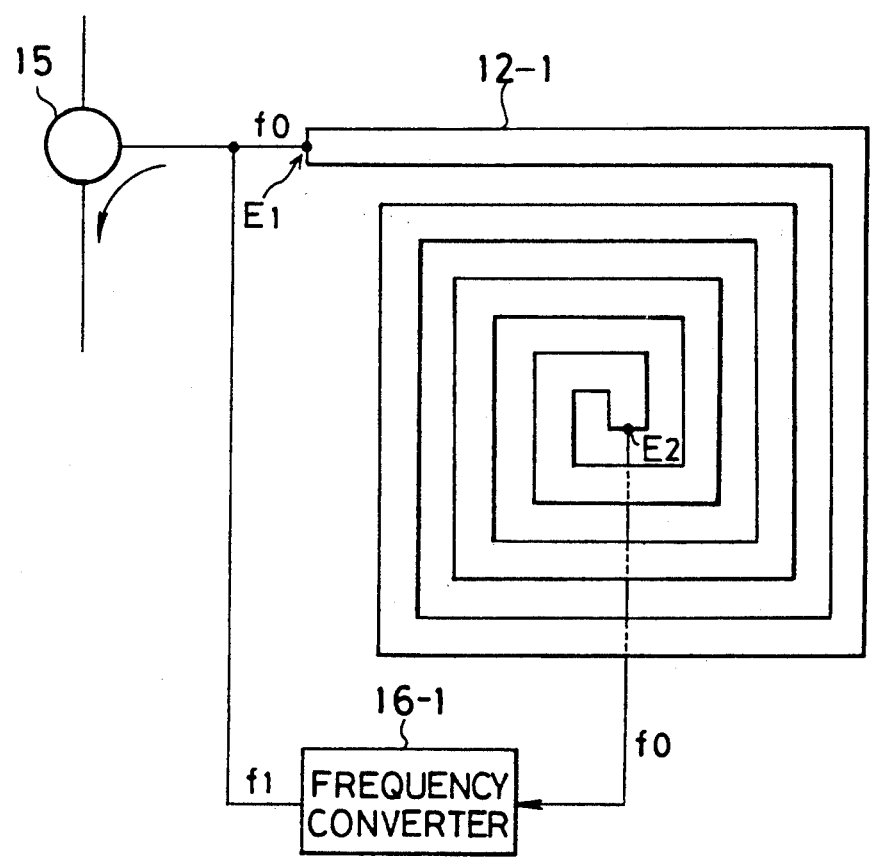
FIG. 9 is an explanatory diagram showing another embodiment of a two-dimensional arrangement of a leaky cable in the invention.

FIG. 9 is an explanatory diagram showing another two-dimensional arrangement of a leaky cable which is used in the invention. The embodiment is characterized in that the leaky cable 12-1 is spirally arranged as a leaky cable which is connected like a branch to the transmission cable 14 through the circulator 15 as shown in the case of the leaky cable 12-1 as a typical example. A cable installation density can be raised and the position detecting accuracy can be improved by such a spiral arrangement of the leaky cable 12-1. The spiral shape of the leaky cable 12-1 is not limited to a rectangle as shown in the diagram, but can be also set to a proper spiral shape such as circle, ellipse, or the like.

In the embodiment of FIG. 1, the leaky cable side has been connected to the transmission cable 14 through the circulator 15. However, the leaky cables 12-1 to 12-n can also be directly connected to the transmission cable by eliminating the circulators 15.

In the case where the position of the data carrier 10-2 has been detected by both of the leaky cables 12-1 and 12-3 in FIG. 1, it is recognized that the data carrier 10-2 exists at an intermediate point of a straight line connecting both of the detection positions.

Further, in the embodiment, although the distance $L_1$ from the cable end $E_1$ has been detected, the distance $L_2$ from the cable end $E_2$ can be also detected on the contrary.

Moreover, the frequency converters 16-1 to 16-n can be also provided on the side of the cable end $E_1$.

Figure 10:
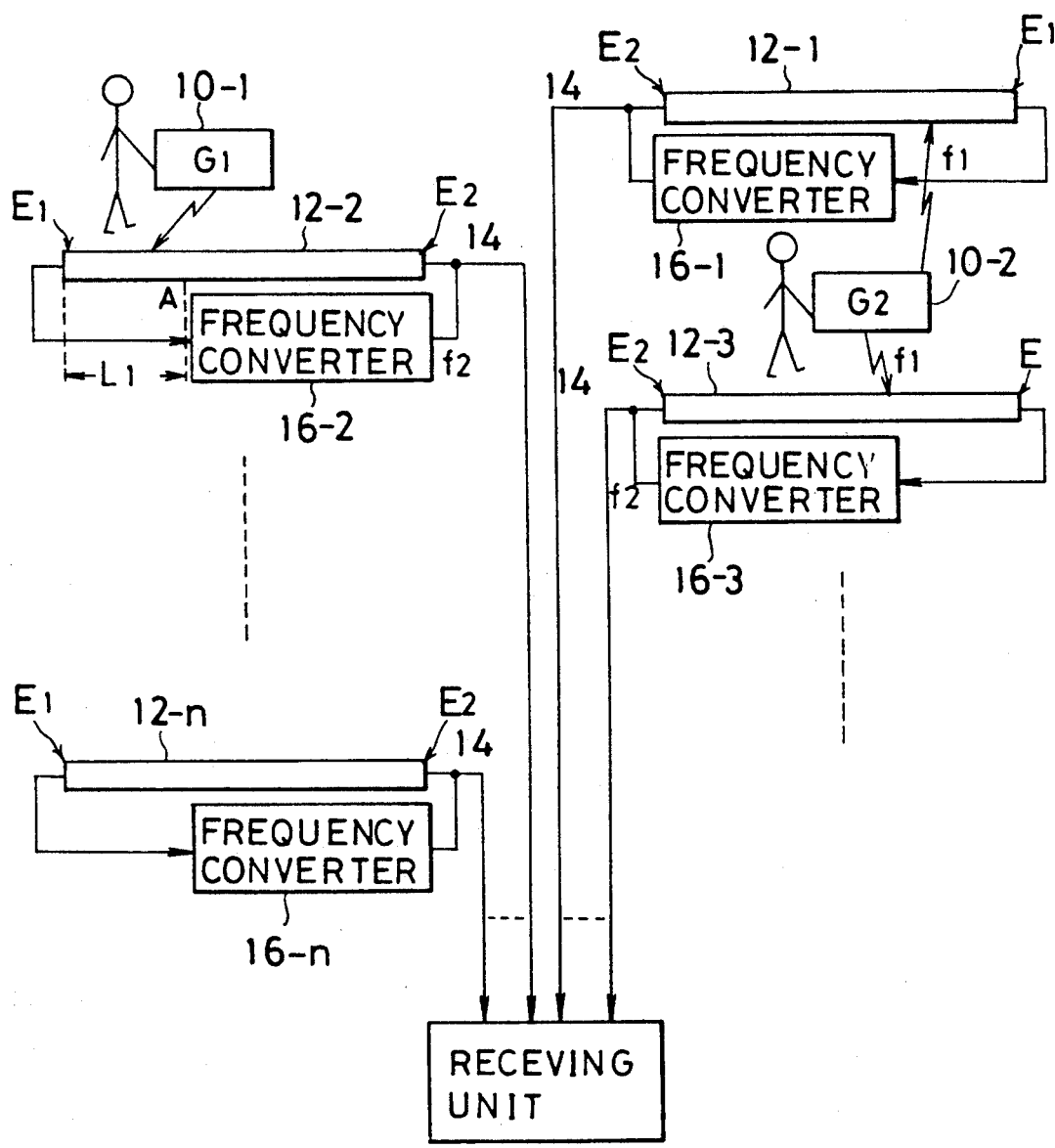
FIG. 10 is a constructional diagram showing the second embodiment of the invention.

FIG. 10 is a constructional diagram showing the second embodiment of the invention. The embodiment is characterized in that the leaky cables 12-1 to 12-n are individually connected to the receiving unit 18.

In FIG. 10, the leaky cables 12-1 to 12-n are distributed and arranged like branches along and just under the floor or along the ceiling in the room of a building, a factory, or the like. Cable ends $E_1$ of the leaky cables 12-1 to 12-n are input-connected to the frequency converters 16-1 to 16-n. The transmission cables 14 are led out of the other ends $E_2$ of the leaky cables 12-1 to 12-n, respectively. The outputs of the frequency converters 16-1 to 16-n are connected to the transmission cable 14. The transmission cables 14 led out of the leaky cables 12-1 to 12-n are connected to the receiving unit 18.

On the other hand, the data carriers shown in FIG. 2 are used as data carriers 10-1 and 10-2. The frequency converters shown in FIG. 4 are also used as frequency converters 16-1 to 16-n.

Figure 11:
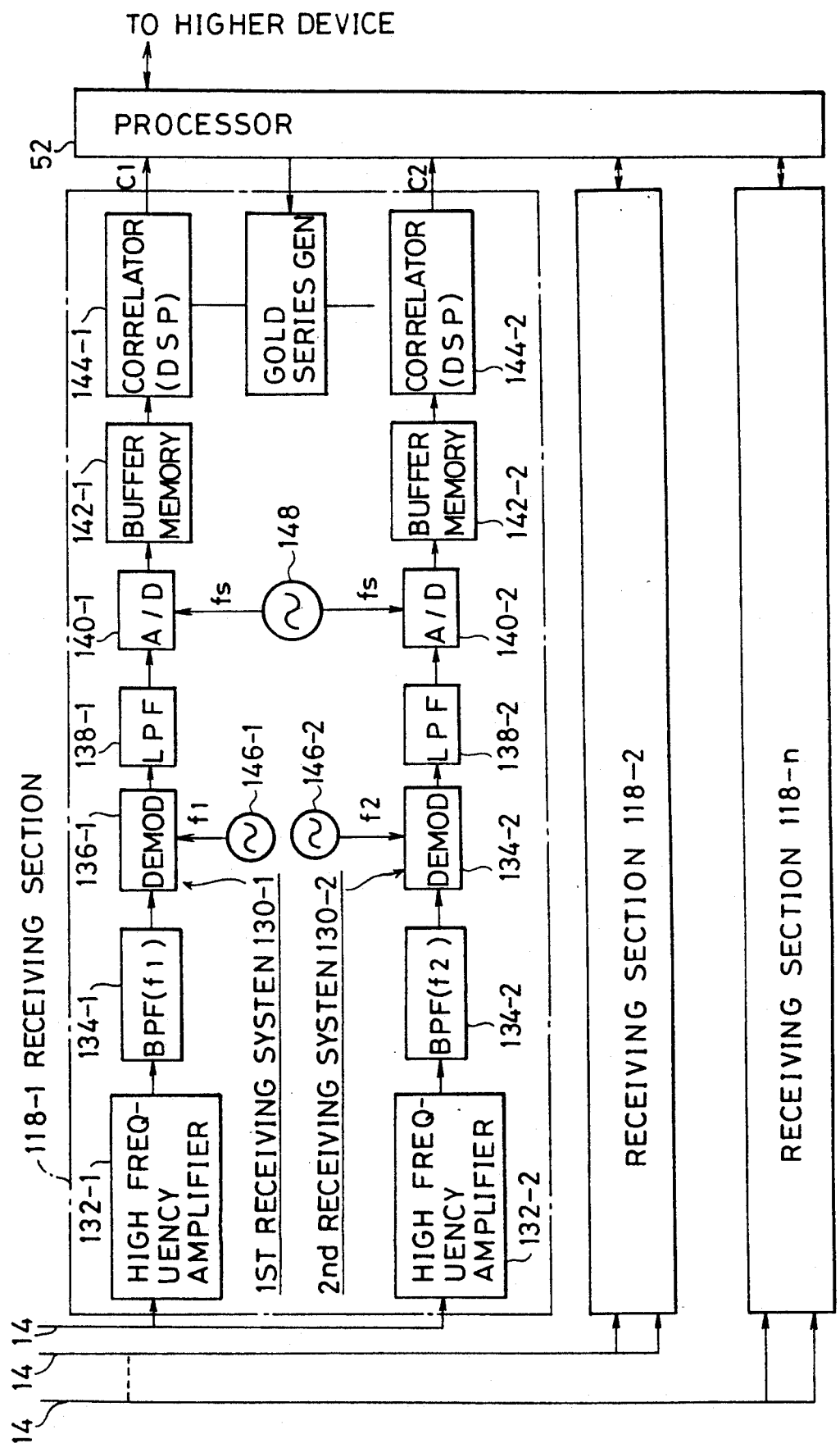
FIG. 11 is a block diagram showing an embodiment of a receiving unit in FIG. 10.

FIG. 11 is a block diagram showing an embodiment of the receiving unit 18 in FIG. 10.

In FIG. 11, receiving sections 118-1 to 118-n are provided in the receiving unit for 18 every leaky cables 12-1 to 12-n. In the embodiment, a construction of the receiving section 118-1 corresponding to the leaky cable 12-1 is practically shown as a typical example.

A first receiving system 130-1 and a second receiving system 130-2 are provided for the receiving section 118-1. The transmission cable 14 from the leaky cable 12-1 is input-connected to those systems in parallel.

The first receiving system 130-1 comprises: a high frequency amplifier 132-1; a band pass filter 134-1 having the center frequency $f_1$; a demodulator 136-1; a local oscillator 146-1 having the oscillating frequency $f_1$; a low pass filter 138-1; an A/D converter 140-1; a buffer memory 142-1; and a correlator 144-1 using a DSP.

On the other hand, the second receiving system 130-2 comprises: a high frequency amplifier 132-2; a band pass filter 134-2 having the center frequency $f_2$; a demodulator 136-2; a local oscillator 146-2 having the oscillating frequency $f_2$; a low pass filter 138-2; an A/D converter 140-2; a buffer memory 142-2; and a correlator 144-2 using a DSP.

Further, as a common circuit section for the first and second receiving systems 130-1 and 130-2, an oscillator 148 for oscillating the sampling frequency $f_s$ is provided for the A/D converters 140-1 and 140-2. The Gold series generator 50 for generating the Gold series $G_1$ to $G_m$ for all of the data carriers by sequentially switching them is also provided for the correlators 144-1 and 144-2.

The operation of the receiving section 18-1 will now be described hereinbelow.

First, it is now assumed that the spread spectrum signal of the center frequency $f_1$ has been received from the leaky cable 12-1 through the transmission cable 14. After the signal is amplified by the high frequency amplifier 132-1, it passes through the band pass filter 134-1 and the signal of the base band indicative of the Gold series is demodulated by the demodulator 136-1 by using the oscillating signal of the frequency $f_1$ from the local oscillator 146-1. Practically speaking, the demodulator 136-1 can be realized by a demodulating circuit of a two-phase modulation signal. The reception signal series of the base band which have been demodulated by the demodulator 136-1 pass through the low pass filter 138-1 and, thereafter, they are sampled by the A/D converter 140-1 by the sampling frequency $f_s$ from the oscillator 148. A sampling period at this time is determined to be a period which is equal to or shorter than the half of the chip period $\Delta T_c$ in the Gold series shown in FIG. 3.

The reception signal series converted into the digital data by the A/D converter 140-1 are stored into the buffer memory 142-1. Each data memory address of the reception signal series of at least one series stored in the buffer memory 142-1 indicates a reception time. After the reception signal series of one series are stored into the buffer memory 142-1, they are read out to the correlator 144-1. The correlator 144-1 executes the correlation calculation every reference series by using the Gold series $G_1$ to $G_m$ which are sequentially given from the Gold series generator 50 and have been assigned to all of the data carriers as reference series.

If the reception signal series and the reference series from the Gold series generator 50 coincide as a result of the correlation calculations, a peak value appears in the correlation output $C_1$ of the correlator 144-1.

The processor 52 recognizes the time when the peak value of the correlation output $C_1$ has been derived on the basis of the memory addresses of the reception signal series in the buffer memory 142-1. Further, the processor 52 can recognize the data carrier which has transmitted the spread spectrum signal on the basis of the reference Gold series generated from the Gold series generator 50 when the peak value had been obtained.

The second receiving system 130-2 is substantially the same as the first receiving system 130-1 except that the center frequency of the band pass filter 134-2 is set to $f_2$ and that the oscillating frequency from the local oscillator 146-2 to the demodulator 136-2 is likewise set to $f_2$. That is, on the side of the second receiving system 130-2, the signal from the cable end $E_1$ of the leaky cable 12-1 in FIG. 10 is frequency converted into the spread frequency $f_2$ by the frequency converter 116-1 and is transmitted, the transmitted signal is received and demodulated, the correlation calculations with the reference Gold series $G_1$ to $G_m$ are finally executed by the correlator 144-2, and the processor 52 recognizes the data carrier from the reference Gold series used in the calculation of the peak value of the correlation output $C_2$.

On the basis of the peak value detection times $t_1$ and $t_2$ of two correlation outputs $C_1$ and $C_2$ shown in FIGS. 8A to 8D, the processor 52 calculates the distance $L_1$ from the end $E_1$ of the leaky cable 12-2 to the reception point A as shown in FIG. 7.

The entire operation of the embodiment of FIG. 10 will now be explained.

Now, assuming that a person who possesses the data carrier 10-1 is located near the leaky cable 12-2 as shown in FIG. 10, the periodic spread spectrum signal is transmitted from the data carrier 10-1 and is received at the reception point A of the leaky cable 12-2. The signal received at the reception point A progresses toward the cable ends $E_1$ and $E_2$. The transmission signal which has reached the cable end $E_1$ is frequency converted from the spread center frequency $f_1$ to another spread center frequency $f_2$ by the frequency converter 16-2 and is given to the receiving unit 18 by the transmission cable 14 together with the signal of the spread center frequency $f_1$ which has already been transmitted to the cable end $E_2$ by the transmission cable 14.

In the receiving unit 18, the reception signal series of the frequency $f_1$ are demodulated by the first receiving system 130-1 in the receiving section 18-2 in FIG. 11 provided in correspondence to the leaky cable 12-2. The reception signal series of the frequency $f_2$ are also demodulated by the second receiving system 130-2. After the demodulation signals of the above series were converted into the digital data, they are supplied to the correlators 144-1 and 144-2 and the correlation calculations with the Gold series $G_1$ to $G_m$ from the Gold series generator 50 are sequentially executed.

Since the data carrier 10-1 has the Gold series $G_1$, the peak values are obtained in accordance with the order of the correlation outputs $C_1$ and $C_2$ as shown in FIGS. 8C and 8D by the correlation calculations with the reference Gold series $G_1$. The processor 52 calculates the delay time $\Delta T$ as follows.

$$\Delta T = t_2 - t_1$$

Then, the processor 52 obtains the distance difference $\Delta L$ from the equation (1) and calculates the distance $L_1$ from the cable end $E_1$ to the reception point A by the equation (2).

The processor 52 further recognizes the data carrier 10-1 from the reference Gold series $G_1$ used in the correlation calculations of the correlation outputs $C_1$ and $C_2$ at which the peak values have been obtained.

Since the position of the leaky cable 12-2 in the building is previously known, the position of the data carrier 10-1 in the building is recognized on the basis of the calculated distance $L_1$ and is informed to the higher order apparatus, thereby allowing proper processes to be performed.

Further, in the case where the position of the data carrier 10-2 in FIG. 10 has been detected by both of the leaky cables 12-1 and 12-3, it is recognized that the data carrier 10-2 exists at an intermediate position of a line connecting the reception point A which is decided by the distance $L_1$ from each of the cable end $E_1$ of the leaky cables 12-1 and 12-3.

Figure 12:
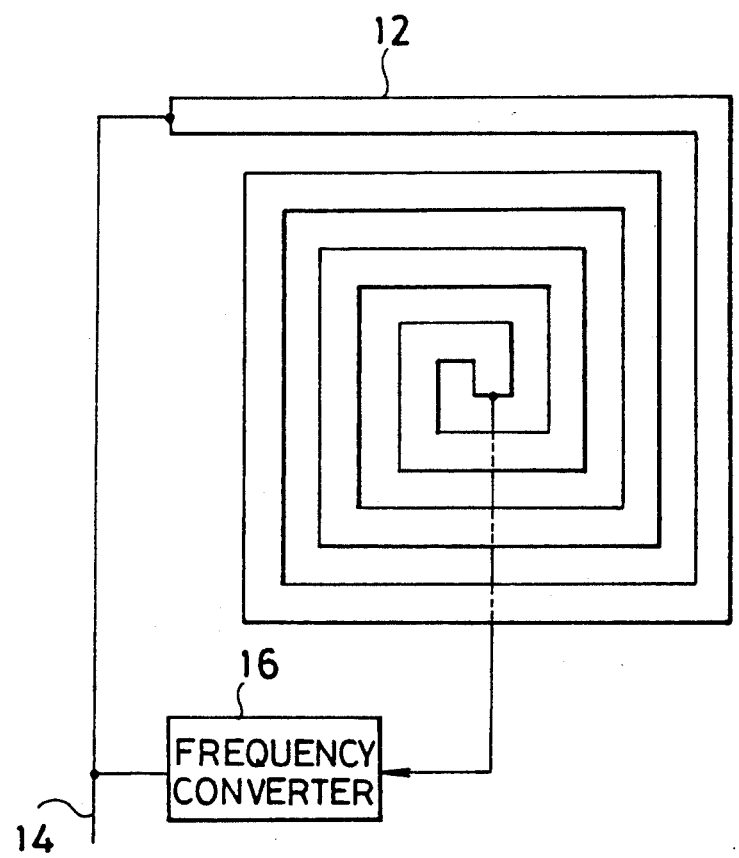
FIG. 12 is an explanatory diagram showing another embodiment of a two-dimensional arrangement of a leaky cable in FIG. 10.

FIG. 12 is an explanatory diagram, showing another two-dimensional arrangement of a leaky cable which is used in the embodiment of FIG. 10 and is characterized in that a leaky cable 12 is spirally arranged like a rectangle in a manner similar to the case of FIG. 9. The cable installation density can be raised and the position detecting accuracy can be improved by such a spiral arrangement of the leaky cable 12. The shape of the leaky cable 12 is not limited to the rectangular spiral shape, but can be set to a proper spiral shape of a circle, an ellipse, or the like.

In the embodiment of FIG. 10, although the signals from the cable ends $E_1$ of the leaky cables 12-1 to 12-n have been frequency converted and transmitted, the signals from the cable ends $E_2$ on the opposite side can be also frequency converted.

Figure 13:
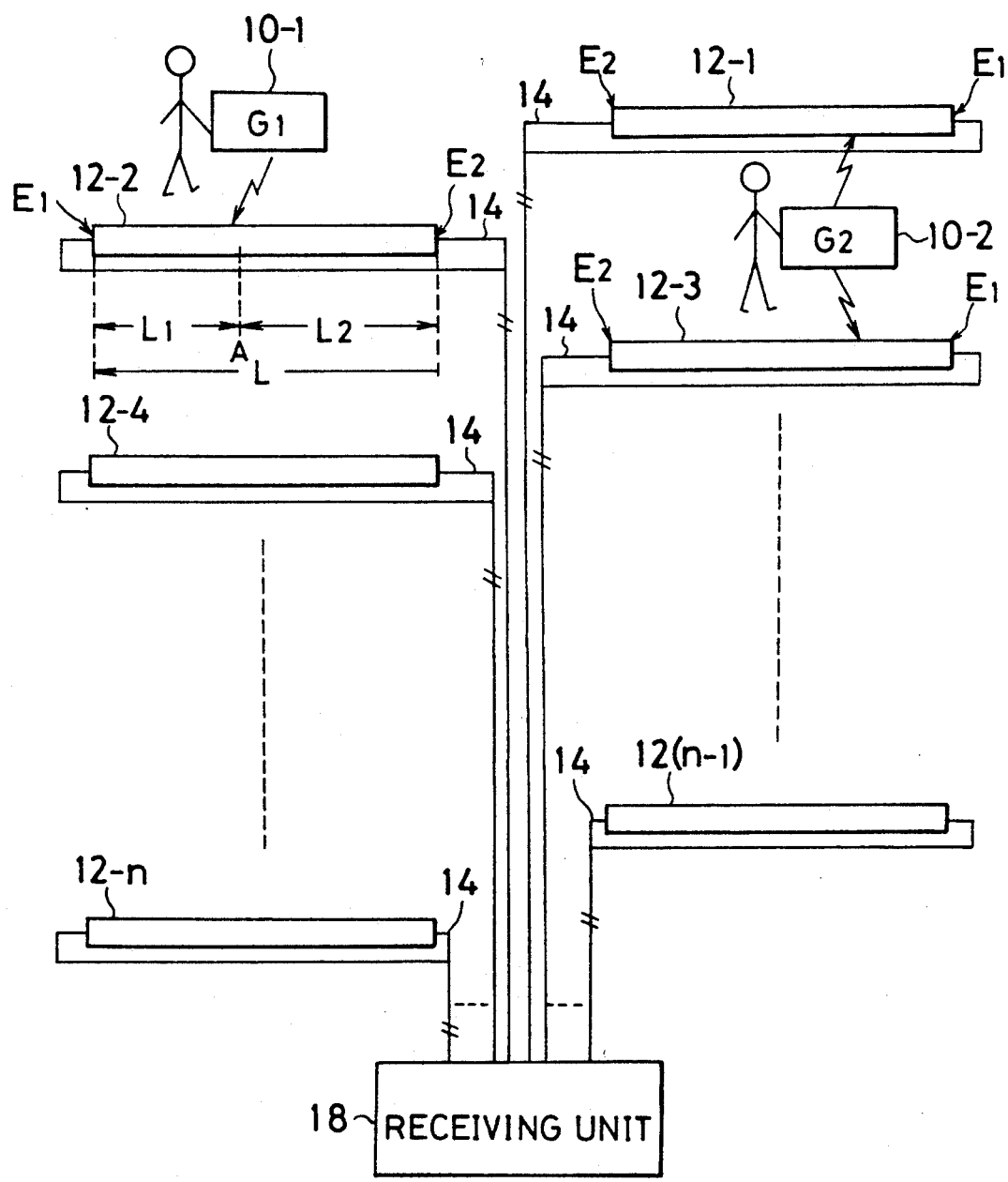
FIG. 13 is a constructional diagram showing the third embodiment of the invention.

FIG. 13 is a constructional diagram showing the third embodiment of the invention. The embodiment is characterized in that the frequency converters 16-1 to 16-n provided for the leaky cables 12-1 to 12-n are unnecessary.

In FIG. 13, the leaky cables 12-1 to 12-n are distributed and arranged like branches along and just under the floor or along the ceiling in the room of, for example, a building, a factory, or the like as shown in the diagram.

The transmission cables 14 are connected to both ends of each of the leaky cables 12-1 to 12-n, respectively. Each of the two transmission cables from each of the leaky cables 12-1 to 12-n is connected to the receiving unit 18.

On the other hand, the data carriers 10-1 and 10-2 are possessed by persons who enter the building, for instance, as shown in the diagram. Data carriers as shown in FIG. 2 are used as data carriers 10-1 and 10-2.

Figure 14:
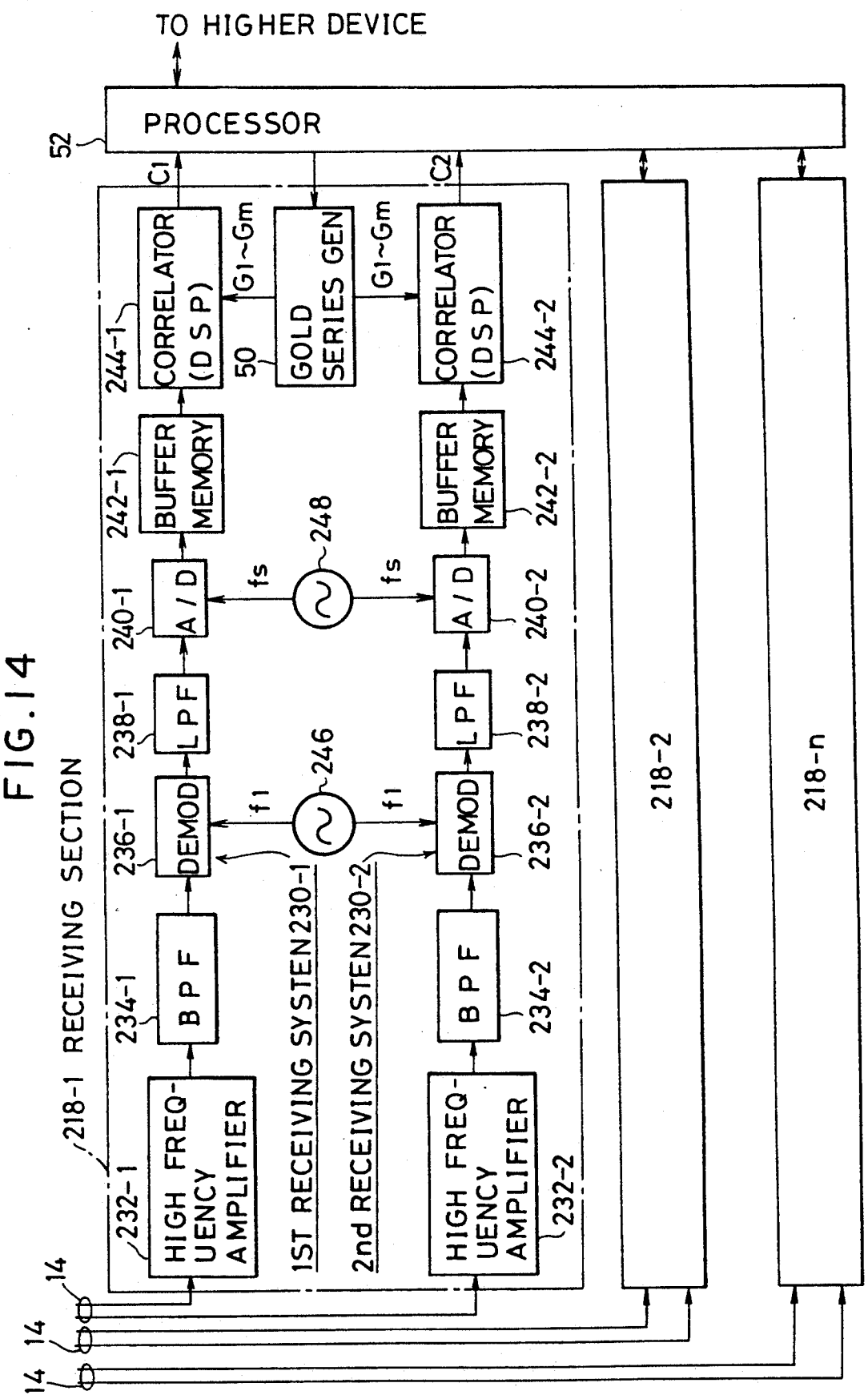
FIG. 14 is a block diagram showing an embodiment of a receiving unit in FIG. 13.

FIG. 14 shows an embodiment of the receiving unit 18 in FIG. 13.

In FIG. 14, independent receiving sections 218-1 to 218-n are provided in the receiving unit 18 for each of the leaky cables 12-1 to 12-n.

A construction of the receiving section 218-1 corresponding to the leaky cable 12-1 is shown as a typical example.

The receiving section 218-1 comprises: a first receiving system 230-1 to which, the transmission cable 14 from one end $E_1$ of the leaky cable 12-1 in FIG. 13 is input-connected; and a second receiving system 230-2 to which the transmission cable 14 from the other end $E_2$ of the leaky cable 12-1 is input-connected.

The first receiving system 230-1 comprises: a high frequency amplifier 232-1; a band pass filter 234-1; a demodulator 236-1; a low pass filter 238-1; an A/D converter 240-1; a buffer memory 242-1; and a correlator 244-1 using a DSP. The second receiving system 230-2 also similarly comprises: a high frequency amplifier 232-2; a band pass filter 234-2; a demodulator 236-2; a low pass filter 238-2; an A/D converter 240-2; a buffer memory 242-2; and a correlator 244-2. As a common circuit section of the above receiving systems, a local oscillator 246 for oscillating the frequency $f_1$ is provided for the demodulators 236-1 and 236-2. A sampling oscillator 248 for oscillating the sampling frequency $f_s$ is commonly provided for the A/D converters 240-1 and 240-2. Further, the Gold series generator 50 for sequentially generating a plurality of Gold series $G_1$ to $G_m$ which have previously been assigned to the data carriers as reference series is provided for the correlators 244-1 244-2.

The processor 52 is connected after the receiving section 218-1. The correlation outputs $C_1$ and $C_2$ of the correlators 244-1 and 244-2 are given to the processor 52. As shown in, for example, FIGS. 8C and 8D, when the peak value is first given from the correlation output $C_1$ of the correlator 244-1, the processor 52 latches the peak value generating time $t_1$ and subsequently monitors the correlation output $C_2$ on the side of the correlator 244-2 and latches the time $t_2$ when the peak value is then obtained.

If two correlation peak values are continuously obtained from the correlation outputs of the correlators 244-1 and 244-2, the processor 52 calculates the delay time ΔT as a difference between the peak value detecting times. On the basis of the delay time ΔT, the processor 52 calculates the distance $L_1$ from the cable end $E_1$ to the reception point A in a manner similar to the case shown in FIG. 7 with respect to, for instance, the leaky cable 12-2 which has received the signal from the data carrier 10-1 in FIG. 13.

The operation of the embodiment in FIG. 13 will now be described.

It is now assumed that a person who possesses the data carrier 10-1 is located near the leaky cable 12-2 as shown in FIG. 13. The spread spectrum signal (frequency $f_1$) which has been spread spectrum modulated in accordance with the Gold series $G_1$ which had previously been assigned is transmitted from the data carrier 10-1 and is received at the A point of the leaky cable 12-2. The reception signal at the A point propagates in the leaky cable 12-2 toward the cable ends $E_1$ and $E_2$. Since there is the following relation between the distances from the cable ends $E_1$ and $E_2$ to the reception point A $$L_1 < L_2$$

the transmission signal which has propagated toward the cable end $E_1$ first reaches the cable end $E_1$ and thereafter the transmission signal which has propagated in the opposite direction reaches the cable end $E_2$. Thus, on the receiving unit 18 side, the spread spectrum signal of one word length from the cable end $E_1$ side is first received and the spread spectrum signal of one word length from the cable end $E_2$ is subsequently received.

As shown in FIG. 14, in the receiving unit 18, the reception signals from the cable ends $E_1$ and $E_2$ are demodulated by the demodulators 236-1 and 236-2 in the receiving section 218-2 corresponding to the leakage cable 12-2. After that, the demodulated signals are converted into the digital data by the A/D converters 240-1 and 240-2 and stored into the buffer memories 242-1 and 242-2. The reception series signals of one word length stored in the buffer memories 242-1 and 242-2 are given to the correlators 244-1 and 244-2. Addresses in the buffer memories 242-1 and 242-2 correspond to the receiving times, so that the receiving times can be known from the addresses in the buffer memories.

The reception signal series of one word length stored in the buffer memories 242-1 and 242-2 are given to the correlators 244-1 and 244-2 and the correlation calculations between the reception signal series and the Gold series $G_1$ to $G_m$ which are sequentially generated from the Gold series generator 50 and have previously been assigned to the data carriers are sequentially executed. The correlation calculations correspond to the product sum calculations between the reception signal series and the reference series which are given from the Gold series generator 50.

When the correlation calculations using the Gold series $G_1$ assigned to the data carrier 10-1 as reference series are executed by the correlators 244-1 and 244-2, as shown in FIGS. 8C and 8D, the peak value corresponding to the time $t_1$ is obtained in the correlation output $C_1$ of the correlator 244-1 and the correlation peak value corresponding to the time $t_2$ is derived in the correlation output $C_2$ of the correlator 244-2.

The processor 52 calculates the delay time ΔT from the times $t_1$ and $t_2$ when the correlation peak values in the correlation outputs $C_1$ and $C_2$ have been derived. Further, the processor 52 obtains the distance difference ΔL from the equation (1).

In the leaky cable 12-2 in FIG. 1, since there is the following relation between the distances $L_1$ and $L_2$ to the reception point A $$L_1 < L_2$$

the delay time ΔT has a plus value. Therefore, by substituting the distance difference ΔL calculated by the equation (1) into the equation (2), the distance $L_1$ from the cable end $E_1$ to the reception point A is calculated.

Since the position of the cable end $E_1$ of the leaky cable 12-2 in the building is previously known on the processor 52 side, if the distance $L_1$ is derived, the position in the building where the data carrier 10-1 exists can be known. In addition, to obtain the correlation peak values, the Gold series generator 50 gives the Gold series $G_1$ to the correlators 244-1 and 244-2 as reference series. Therefore, by recognizing the reference Gold series by the processor 52 side, the data carrier 10-1 can be recognized.

Therefore, the fact that the data carrier 10-1 exists at the position of the distance $L_1$ from the cable end $E_1$ of the leaky cable 12-2 installed in the building is informed to a higher order apparatus or the like by the processor 52, thereby allowing necessary processes to be executed.

Further, as shown on the sides of the leaky cables 12-1 and 12-3 in FIG. 13, if the position of the data carrier 10-2 has been detected by both of the leaky cables 12-1 and 12-3, it is possible to recognize that the data carrier 10-2 exists at an intermediate position of a line connecting the positions which are decided by the distances $L_1$ from the ends $E_1$ of the leaky cables 12-1 and 12-3.

Figure 15:
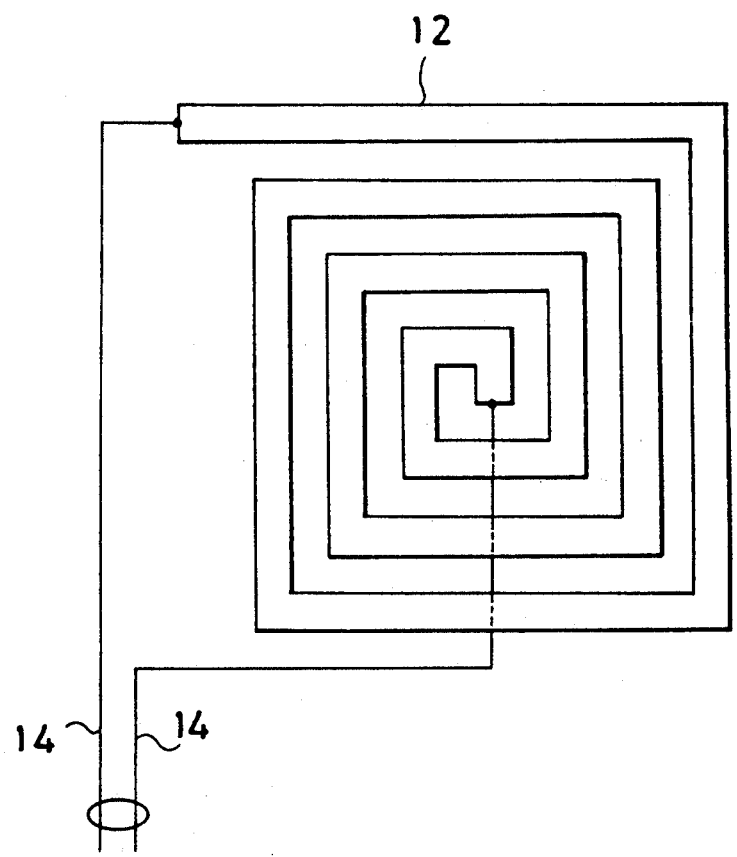
FIG. 15 is an explanatory diagram showing another embodiment of a two-dimensional arrangement of a leaky cable in FIG. 13.

FIG. 15 is an explanatory diagram showing another two-dimensional arrangement of a leaky cable used in FIG. 13. The embodiment is characterized in that the leaky cable 12 is spirally arranged like a rectangle and the transmission cables 14 are led out of the cable ends $E_1$ and $E_2$, respectively. The shape of the leaky cable 12 is not limited to the rectangular spiral shape, but can be also set to a proper spiral shape of a circle, an ellipse, or the like.

What is claimed is:

1. An object position detecting system comprising:
  (A) a plurality of portable data carriers each having a unique pseudo random series assigned thereto corresponding to an ID code and each for generating a spread spectrum signal by modulating a carrier signal having a first frequency which is common to all of the portable data carriers by the unique pseudo random series assigned thereto;
  (B) a plurality of leaky cables, two-dimensionally distributed and arranged throughout a building structure, each having opposite first and second ends and a predetermined line length;
  (C) a plurality of frequency converters, respectively connected to the first end of said plurality of leaky cables, each for frequency converting a spread spectrum signal generated by a portable data carrier and received by and transmitted within a leaky cable connected thereto into a frequency converted spread spectrum signal of one of a plurality of unique frequencies respectively assigned to said leaky cables;

(D) transmission cables commonly connected to an output of each of said frequency converters and to the second end of each of the leaky cables; and (E) a receiving unit, connected to said transmission cables, for calculating a position on one of said leaky cables where one of said portable data carriers is in close proximity and for discriminating said one of said portable data carriers based on at least one a correlation between a received spread spectrum signal and a received frequency converted spread spectrum signal and a correlation between a pseudo random series contained within the spread spectrum signals and the plurality of the unique pseudo random series assigned to the portable data carriers.

2. A system according to claim 1, wherein the receiving unit comprises:

first demodulating means for demodulating a pseudo random series signal from a spread spectrum signal received from the transmission cables by the first frequency;

second demodulating means for respectively demodulating a pseudo random series signal from the frequency converted spread spectrum signals received from the transmission cables by the plurality of unique frequencies assigned to the leaky cables;

first correlation calculating means for calculating correlation values between the pseudo random series signal demodulated by said first demodulating means and said plurality of unique pseudo random series assigned to the portable data carriers;

second correlation calculating means for calculating correlation values between the pseudo random series signal demodulated by said second demodulating means and said plurality of unique pseudo random series assigned to the portable data carriers, delay time measuring means for measuring a delay time extending from a time in which a correlation peak value is derived from said first correlation calculating means to a time in which a correlation peak value is derived from said second correlation calculating means;

position calculating means for calculating the position of the leaky cable where the portable data carrier is in close proximity based on said delay time; and data carrier recognizing means for discriminating said one of said portable data carriers from the pseudo random series signals used to calculate the correlation peak values.

3. An object position detecting system comprising:

(A) a plurality of portable data carriers each having a unique pseudo random series assigned thereto corresponding to an ID code and each for generating a spread spectrum signal by modulating a carrier signal having a first frequency by the unique pseudo random series assigned thereto;

(B) a plurality of leaky cables, two-dimensionally distributed and arranged throughout a building structure, each having opposite first and second ends and a predetermined line length;

(C) a plurality of frequency converters, respectively connected to said first ends of said plurality of leaky cables, each for frequency converting a spread spectrum signal generated by a portable data carrier and received by and transmitted within a leaky cable connected thereto into a frequency converted spread spectrum signal of a second frequency;

(D) a plurality of transmission cables, respectively connected to said leaky cables and to said frequency converters, each for transmitting a frequency converted spread spectrum signal of a frequency converter connected thereto and a spread spectrum signal from the second end of a leaky cable connected thereto; and (E) a receiving unit, connected to said transmission cables, for calculating a position on one of said leaky cables where one of said portable data carriers is in close proximity and for discriminating said one of portable data carriers based on at least a correlation between a received spread spectrum signal and a received frequency converted spread spectrum signal and a correlation between a pseudo random series contained within the spread spectrum signals and the plurality unique pseudo random series assigned to the portable data carriers.

4. A system according to claim 3, wherein said receiving unit comprises for each leaky cable:

first demodulating means for demodulating a pseudo random series signal from a spread spectrum signal received from the transmission cables by the first frequency;

second demodulating means for respectively demodulating a pseudo random series signal from the frequency converted spread spectrum signals received from the transmission cables by the second frequency;

first correlation calculating means for calculating correlation values between the pseudo random series signal demodulated by said first demodulating means and said plurality of unique pseudo random series assigned to the portable data carriers;

second correlation calculating means for calculating correlation values between the pseudo random series signal demodulated by said second demodulating means and said plurality of unique pseudo random series assigned to the portable data carriers, delay time measuring means for measuring a delay time extending from a time in which a correlation peak value is derived from said first correlation calculating means to a time in which a correlation peak value is derived from said second correlation calculating means;

position calculating means for calculating the position of the leaky cable where the portable data carrier is in close proximity based on said delay time; and data carrier recognizing means for discriminating said one of said portable data carriers from the pseudo random series signals used to calculate the correlation peak values.

5. An object position detecting system comprising:

(A) a plurality of portable data carriers each having a unique pseudo random series assigned thereto corresponding to an ID code and each for generating a spread spectrum signal by modulating a carrier signal of a predetermined frequency unique pseudo random series assigned thereto;

(B) a plurality of leaky cables, two-dimensionally distributed and arranged throughout a building structure, each having opposite first and second ends and a predetermined line length;

(C) a plurality of transmission cables each of which is connected to both of said first and second ends of said plurality of leaky cables, respectively; and (D) a receiving unit, connected to said transmission cables, for calculating a position on one of said leaky cables where one of said portable data carriers is in close proximity and for discriminating said one of portable data carriers based on at least a correlation between a received spread spectrum signal from said first end of said one of said leaky cables and a received spread spectrum signal from said second end of said one of said leaky cables and a correlation between a pseudo random series contained within the spread spectrum signals and the unique pseudo random series assigned to the portable data carriers.

6. A system according to claim 5, wherein said receiving unit comprises for each leaky cable:

first demodulating means for demodulating a pseudo random series signal from a spread spectrum signal received from one of the transmission cables;

second demodulating means for demodulating a pseudo random series signal from a spread spectrum received from another one of the transmission cables;

first correlation calculating means for calculating correlation values between the pseudo random series signal demodulated by said first demodulating means and said plurality of unique pseudo random series assigned to the portable data carriers;

second correlation calculating means for calculating correlation values between the pseudo random series signal demodulated by said second demodulating means and said plurality of unique pseudo random series assigned to the portable data carriers, delay time measuring means for measuring a delay time extending from a time in which a correlation peak value is derived from said first correlation calculating means to a time in which a correlation peak value is derived from said second correlation calculating means;

position calculating means for calculating the position of the leaky cable where the portable data carrier is in close proximity based on said delay time; and data carrier recognizing means of discriminating said one of said portable data carriers from the pseudo random series signals used to calculate the correlation peak values.

7. A system according to any one of claims 1 to 6, wherein Gold series are used as the pseudo random series assigned to the portable data carriers.

8. A system according to any one of claims 1, 3, and 5, wherein said leaky cables are connected to branch out from said transmission cables.

9. A system according to any one of claims 1, 3, and 5, wherein said leaky cables are connected to branch out from said transmission cables and wherein each of the leaky cables has a spiral configuration.

* * * * *